(12) United States Patent
Song et al.

(10) Patent No.: US 9,523,858 B2
(45) Date of Patent: Dec. 20, 2016

(54) AUTOSTEREOSCOPIC DISPLAY SYSTEM AND METHOD (71) Applicant: SuperD Co. Ltd., Shenzhen (CN)

(72) Inventors: Lei Song, Shenzhen (CN); Yinwei Chen, Shenzhen (CN); Jing Zhang, Shenzhen (CN)

(73) Assignee: SUPERD CO. LTD., Shenzhen (CN)

( * ) Notice: Subject to any disclaimer, the term of this patent is extended or adjusted under 35 U.S.C. 154(b) by 59 days.

(21) Appl. No.: 14/513,389

(22) Filed: Oct. 14, 2014

(65) Prior Publication Data
US 2015/0029584 A1 Jan. 29, 2015

Related U.S. Application Data (63) Continuation-in-part of application No. 12/939,166, filed on Nov. 3, 2010, now Pat. No. 8,896,919.

(30) Foreign Application Priority Data

Oct. 15, 2010 (CN) .......................... 2010 1 0510410

(51) Int. Cl.
G02B 27/22 (2006.01)
H04N 13/04 (2006.01)
G02B 27/26 (2006.01)
G02F 1/29 (2006.01)
H04N 13/00 (2006.01)

(52) U.S. Cl.
CPC ........... *G02B 27/2214* (2013.01); *G02B 27/26* (2013.01); *G02F 1/29* (2013.01); *H04N 13/0404* (2013.01); *H04N 13/0409* (2013.01); *H04N 13/0413* (2013.01); *H04N 13/0452* (2013.01); *G02F 2001/294* (2013.01); *G02F 2201/30* (2013.01); *H04N 2013/0081* (2013.01)

(58) Field of Classification Search
CPC ... G02B 27/2214; G02B 3/14; H04N 13/0404; H04N 13/0029; F21V 14/003
USPC ........... 359/463, 464; 349/15, 139, 200, 201
See application file for complete search history.

(56) References Cited

U.S. PATENT DOCUMENTS

| 7,933,069 | B2* | 4/2011 | Morozumi | ............... G02B 3/14 348/59 |
| 8,194,195 | B2* | 6/2012 | Hofmann | ............... F21V 14/003 349/200 |
| 8,330,881 | B2* | 12/2012 | Krijn | .................. H04N 13/0029 349/15 |
| 2008/0212007 | A1* | 9/2008 | Meredith | ............... G02C 7/083 349/139 |

FOREIGN PATENT DOCUMENTS

CN 101341433 1/2009

* cited by examiner

Primary Examiner — Audrey Y Chang
(74) Attorney, Agent, or Firm — Anova Law Group, PLLC (57) ABSTRACT A three-dimensional (3D) display system is provided. The 3D display system includes a display device and a switchable grating. The display device is configured to display a set of images with parallax for 3D display. The switchable grating comprises a plurality of switchable grating units, and each switchable grating unit has variable width and variable refractive index and has electric-signal-controllable optical parameters. The switchable grating is coupled with the display device, and configured to enable directional light transmission so as to separate lights of the set of images into predetermined viewing directions to effect the 3D display. Further, the switchable grating includes a first substrate having a plurality of first-type electrodes; a second substrate having at least one second-type electrode; and an optical material contained between the first substrate and the second substrate.

15 Claims, 9 Drawing Sheets

AUTOSTEREOSCOPIC DISPLAY SYSTEM AND METHOD

CROSS-REFERENCES TO RELATED APPLICATIONS

This application is a continuation-in-part (CIP) application of U.S. patent application Ser. No. 12/939,166, filed on Nov. 3, 2010, which claims the priority of Chinese patent application no. 201010510410.2, filed on Oct. 15, 2010, the entire contents of all of which are incorporated herein by reference.

FIELD OF THE INVENTION

The present invention generally relates to opt-electronic and autostereoscopic display technologies and, more particularly, to the methods and systems for parameter-adjustable autostereoscopic display.

BACKGROUND

Autostereoscopic display technology provides three dimensional (3D) imagery without the need for special glasses or other viewing aids, and thus may provide for greater commercial acceptance. Conventional autostereoscopic display technology often uses a static parallax barrier or lenticular screen to effect 3D display. The static parallax barrier or lenticular screen is manufactured with certain system parameters. As a result of the manufacture of the barrier or screen, the system parameters such as grating width of the barrier or screen are fixed once constructed and cannot be changed without building a new barrier or screen.

Further, the conventional autostereoscopic display technology uses parallax between two sets of images to show 3D images via the parallax barrier or lenticular screen, which may often have a small fixed grating width. The fixed grating width thus only supports a limited range of parallax. If an actual parallax exceeds this limited range, it may result in the displayed images having a bad quality, such as causing interference, ghosting and other undesired behavior. On the other hand, if a large grating width is used, although it may allow a large range of parallax, the clarity of the 3D images may be reduced.

Certain virtual reality system display techniques have been developed to dynamically change parallax barrier strip width. For example, U.S. patent application publication no. 20080143895, titled "dynamic parallax barrier autostereoscopic display system and method," disclosed a virtual reality display system that uses a specific 2-LCD stack system dynamically generating parallax strips based on head movement tracking. However, such techniques may be limited to the disclosed specific 2-LCD stack system and may often fail to address impacts of the dynamically generated parallax strips.

The disclosed methods and systems are directed to solve one or more problems set forth above and other problems.

BRIEF SUMMARY OF THE DISCLOSURE

One aspect of the present disclosure includes a three-dimensional (3D) display system. The 3D display system includes a display device and an optical device. The display device is configured to display sets of images with parallax for a 3D display. The optical device has electric-signal-controllable optical parameters and is coupled with the display device. Further, the optical device is configured to enable directional light transmission so as to separate lights of the sets of images into predetermined viewing directions to effect the 3D display.

Another aspect of the present disclosure includes a method used in a 3D display system. The 3D display system includes a display device configured to display at least two sets of images with parallax for 3D display and an optical device coupled with the display device. The optical device is configured to enable directional light transmission so as to separate the sets of images into predetermined viewing directions effect the 3D display. The method includes receiving relevant operational information of the 3D display system, and determining whether to adjust at least one system parameter of the optical device based on the received operational information. The method also includes calculating at least one of parallax information between the sets of images and 3D display region information when it is determined to adjust the system parameter. Further, the method includes determining at least a new value for the system parameter of the optical device based on the at least one of parallax information between the sets of images and 3D display region information, and applying the new value to the optical device.

Another aspect of the present disclosure includes an optical device. The optical device includes a first substrate having a plurality of first-type electrodes; and a second substrate having at least one second-type electrode. The optical device also includes an optical material contained between the first substrate and the second substrate. The optical material is configured to form a lens grating capable of directional light transmission to separate lights of sets of images with parallax into predetermined viewing directions to effect a 3D display. Further, the lens grating has electric-signal-controllable optical parameters when a plurality of voltages are applied to the first-type electrodes and second-type electrode.

Another aspect of the present disclosure includes a three-dimensional (3D) display system. The 3D display system includes a display device and a switchable grating. The display device is configured to display a set of images with parallax for 3D display. The switchable grating comprises a plurality of switchable grating units, and each switchable grating unit has variable width and variable refractive index and has electric-signal-controllable optical parameters. The switchable grating is coupled with the display device, and configured to enable directional light transmission so as to separate lights of the set of images into predetermined viewing directions to effect the 3D display. Further, the switchable grating includes a first substrate having a plurality of first-type electrodes; a second substrate having at least one second-type electrode; and an optical material contained between the first substrate and the second substrate. The optical material is configured to form the plurality of switchable grating units in the switchable grating when a plurality of voltages are applied to the first-type electrodes and second-type electrode. The plurality of voltages are arranged as a series of voltage patterns, each being applied on a number of the plurality of first-type electrodes to form a switchable grating unit with a corresponding width.

Another aspect of the present disclosure includes an optical device. The optical device includes a first substrate having a plurality of first-type electrodes; a second substrate having at least one second-type electrode; and an optical material contained between the first substrate and the second substrate. The optical material is configured to form a switchable grating containing a plurality of switchable grating units when a plurality of voltages are applied to the first-type electrodes and second-type electrode. Each switchable grating unit has variable width and variable refractive index and has electric-signal-controllable optical parameters, and the switchable grating is coupled with a display device and configured to enable directional light transmission so as to separate lights of a set of images into predetermined viewing directions to effect 3D display. The plurality of voltages are arranged as a series of voltage patterns, each being applied on a number of the plurality of first-type electrodes to form the switchable grating unit with a corresponding width.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1A:
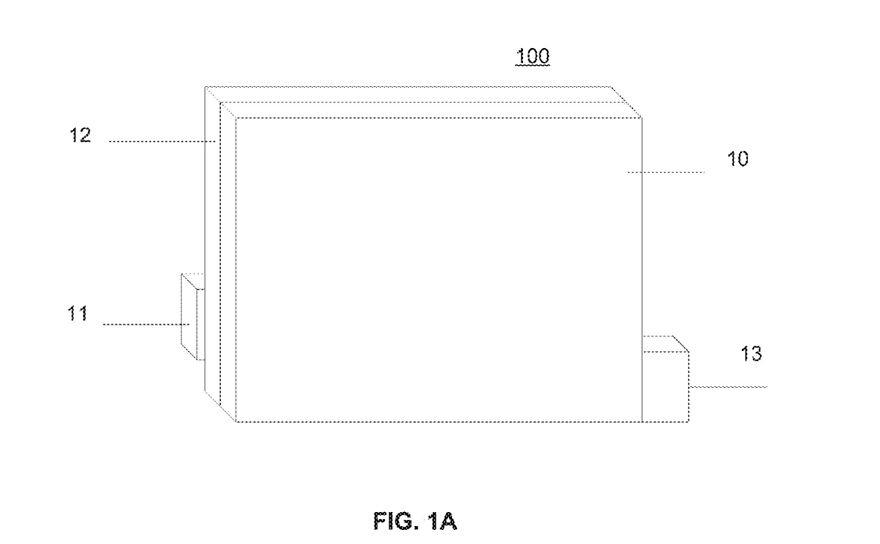
FIG. 1A illustrates a block diagram of an exemplary autostereoscopic display system consistent with the disclosed embodiments.

FIG. 1A shows an exemplary block diagram of an autostereoscopic display system 100 consistent with the disclosed embodiments. As shown in FIG. 1A, autostereoscopic display system 100 may include an optical device 10, a controller 11, a display device 12, and a signal source 13. Other components may be added and certain devices may be removed without departing from the principles of the disclosed embodiments.

Display device 12 may include any appropriate device for displaying images, such as a plasma display panel (PDP) display, a cathode ray tube (CRT) display, a liquid crystal display (LCD), an organic light emitting diode (OLED) display, and other types of displays. Display device 21 may be used in computers, consumer electronics, professional equipment, or other systems requiring information display. Display device 12 may be coupled with signal source 13 to display two-dimensional (2D) images and 3D images. Signal source 13 may include any appropriate source of audio, video, and images, such as output from a set top box, a digital receiver, a TV tuner, a network adaptor, an information storage, or a DVD or other media player.

For 3D images, signal source 13 may be provided with sets of images with certain parallax to be viewed by a viewer's left eye and right eye separately, and display device 12 may display the sets of images concurrently. The 3D images may include at least two sets of images used for 3D display. The 3D images may be in a stereo format, which means that a 3D image includes two images from two viewpoints, a first image and a second image. For example, the 3D image includes a first image to be viewed by a viewer's left eye (i.e., a left image) and a second image to be viewed by the viewer's right eye (i.e., a right image), with a certain parallax between the left image and the right image.

The 3D images may also be in a multi-view format, which means a 3D image includes multiple images (i.e., a set of images) from multiple viewpoints. For example, the 3D image may include the first, second, . . . and $N^{th}$ images (N is an integer number greater than 2). A certain parallax exists between two neighboring images of the N images to be viewed by a viewer's left and right eyes respectively.

Further, display device 12 may be coupled with optical device 10 such that lights from display device 12 are transmitted along predetermined viewing directions to separate the sets of images in order to display 3D images associated with the sets of images to the viewer. That is, the viewer's left eye and right eye can only see a related set of images to achieve a 3D perception.

Optical device 10 may include any appropriate optical device capable of generating 3D effects by separating sets of images on display device 12 into different directions for a viewer(s) to perceive 3D images. For example, optical device 10 may include a parallax barrier (e.g., a slit grating) and/or lenticular screen (e.g., a lens grating) to separate interleaved left and right images for a single viewer or multiple viewers. Other types of structures may also be included.

Optical device 10 may also have dynamically adjustable system parameters to improve the quality of 3D images and/or user viewing experience. Such adjustable system parameters may include adjustable width, length, and/or orientation of gratings of optical device 10, and/or adjustable brightness, transparency, and other characteristics of optical device 10. For example, optical device 10 may be dynamically configured to be transparent without light refraction such that optical device 10 does not change entering lights and display system 100 displays 2D images, or optical device 10 may be configured to a grating device (e.g., a lenticular lens grating or a parallax barrier grating) to enable directional light transmission to enable 3D image display as explained in sections below. This 2D/3D switching may be controlled by controller 11 during operation.

Figure 3:
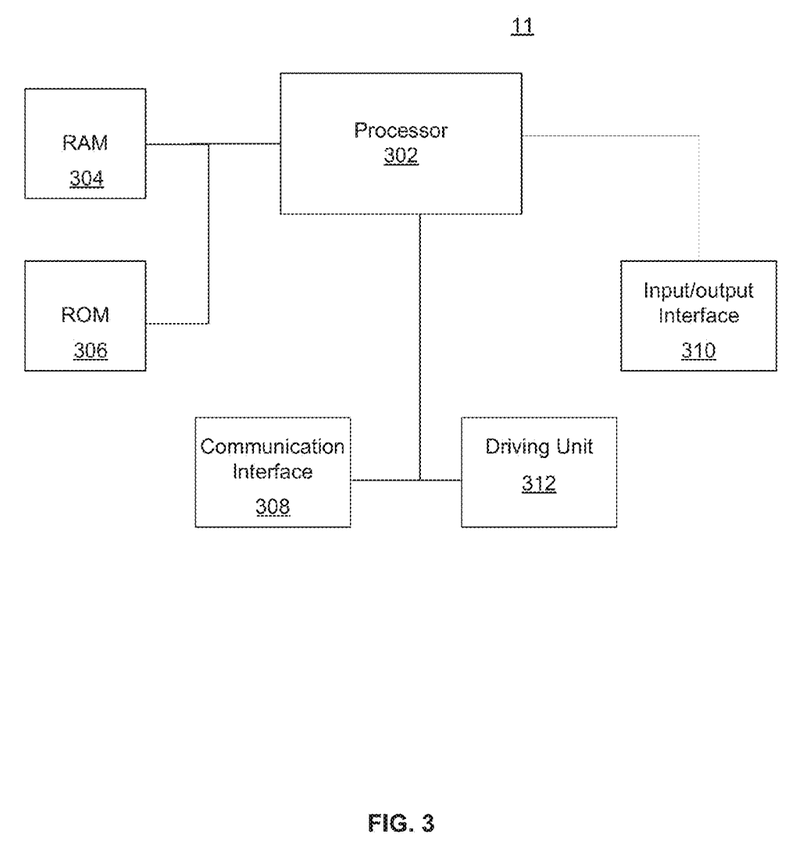
FIG. 3 illustrates a block diagram of an exemplary controller consistent with the disclosed embodiments.
Figure 4:
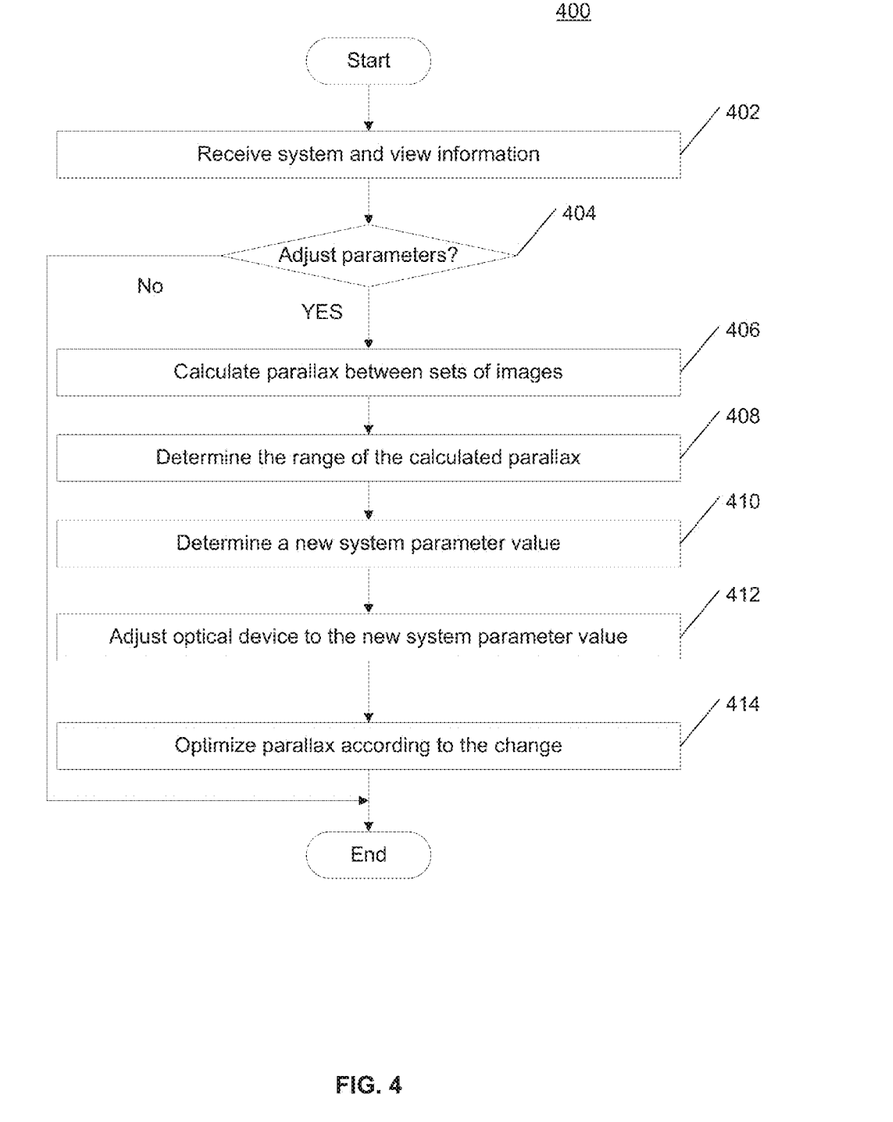
FIG. 4 illustrates an exemplary control process consistent with the disclosed embodiments.

Controller 11 may be provided to control optical device 10 (e.g., to control certain adjustable system parameters). In other words, optical device 10 has electric-signal-controllable system parameters or optical parameters. Controller 11 may also control operation of autostereoscopic display system 100 including display device 12. Further, controller 11 may include any appropriate control device capable of providing control functions for autostereoscopic display system 100. FIG. 3 shows an exemplary block diagram of controller 11.

As shown in FIG. 3, controller 11 may include a processor 302, a random access memory (RAM) unit 304, a read-only memory (ROM) unit 306, a communication interface 308, an input/output interface unit 310, and a driving unit 312. Other components may be added and certain devices may be removed without departing from the principles of the disclosed embodiments.

Processor 302 may include any appropriate type of general purpose microprocessor, digital signal processor or microcontroller, and application specific integrated circuit (ASIC). Processor 302 may execute sequences of computer program instructions to perform various processes associated with autostereoscopic display system 100. The computer program instructions may be loaded into RAM 304 for execution by processor 302 from read-only memory 306.

Communication interface 308 may provide communication connections such that autostereoscopic display system 100 may be accessed remotely and/or communicate with other systems through computer networks or other communication networks via various communication protocols, such as transmission control protocol/internet protocol (TCP/IP), hyper text transfer protocol (HTTP), etc.

Input/output interface 310 may be provided for users to input information into autostereoscopic display system 100 or for the users to receive information from autostereoscopic system 100. For example, input/output interface 310 may include any appropriate input device, such as a remote control, a keyboard, a mouse, an electronic tablet, voice communication devices, or any other optical or wireless input devices. Further, driving unit 312 may include any appropriate driving circuitry to drive various devices, such as optical device 10 and/or display device 12. For example, driving circuitry of driving unit 312 may provide different voltages to various electrodes of optical device 10.

Figure 1B:
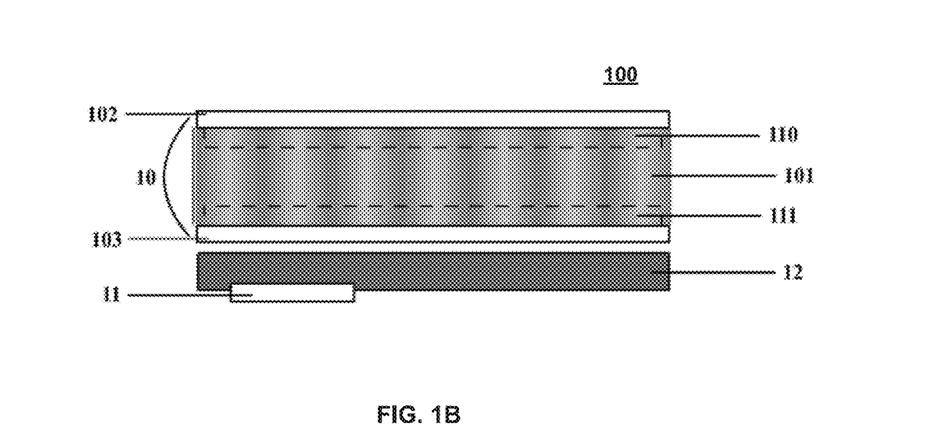
FIG. 1B illustrates a cross-section view of an exemplary autostereoscopic display system consistent with the disclosed embodiments.

FIG. 1B illustrates an exemplary cross-section view of autostereoscopic display system 100. As shown in FIG. 1B, optical device 10 may be placed on top of or coupled with display device 12, and may include a first substrate 102, a second substrate 103, and optical material 101. Substrates 102 and 103 may be made of any appropriate material, such as glass or silicon. Optical material 101 may include any appropriate type of optical material whose refractive index may change under different voltages applied thereto or light passage through which may be switched between an on-state and an off-state when the applied voltage changes. For example, optical material 101 may include nematic liquid crystal, ferroelectric liquid crystal, other types of liquid crystal, or any appropriate electrowetting materials and polymers.

Optical material 101 may be placed between substrates 102 and 103. Electrode sections 110 and 111 are attached to or built on the surfaces of substrates 102 and 103, respectively, such as using thin-film based techniques. Electrical voltages applied to electrode sections 110 and 111 may cause the refractive index or the light passage switching state of optical material 101 to change. Such change may create the effect of the lens array (or lens grating) or the parallax barrier array (or parallax barrier grating) and thus implement the directional light transmission mechanism needed for autostereoscopic display. As disclosed herein, lens array and lens grating or grating may be used interchangeably. Similarly, slit array and parallax barrier array or parallax barrier grating may be used interchangeably. Further, different electrode voltages applied on electrode sections 110 and 111 may also change parameters of the lens grating or parallax barrier grating.

Electrode section 110 may include a single electrode or a plurality of electrodes, and electrode section 111 may also include a single electrode or a plurality of electrodes. Different voltages may be applied to those electrodes. The plurality of voltages may be arranged as a series of voltage patterns, each being applied on a number of the plurality of electrodes to form a switchable grating unit with a corresponding width. The shape of the electrode or electrodes may be designed to any appropriate shape, such as a plane, strips, or other geometric shapes. Further, when a plurality of electrodes are used, the plurality of electrodes may be arranged vertically or horizontally. The vertical direction and the horizontal direction are used for exemplary purposes, any appropriate directions or arrangements may also be used. FIGS. 2A, 2B, 2C, 2D, and 2E illustrate certain exemplary structures of optical device 10.

Figure 2A:
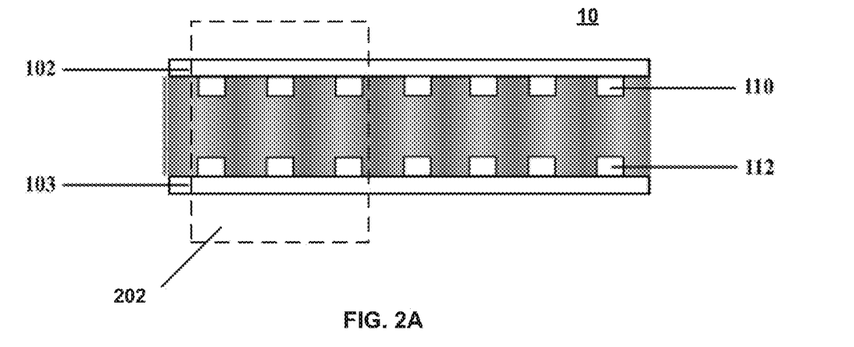
FIG. 2A illustrates an exemplary structure of an optical device consistent with the disclosed embodiments.

As shown in FIG. 2A, electrode sections 110 and 112 each includes a plurality of electrodes in a strip shape and arranged horizontally. A certain number of electrodes from section 110 and a certain number of electrodes from section 112 may be combined to comprise an effective unit 202. For illustrative purpose, the number of electrodes from section 110 and the corresponding number of electrodes from section 112 are the same and denoted as 'n'.

When different voltages are applied to the n number of electrodes in sections 110 and 112, an electric field is formed between the electrodes of sections 110 and 112. The electric field causes certain changes in optical material 101. For example, along the electric field, molecules of optical material 101 (e.g., liquid crystal) may arrange in a certain angle, and different parts or locations of optical material 101 (within effective unit 202) may have different refractive indices and optical paths.

Thus, by controlling voltages applied to the n number of electrodes (i.e., activated electrodes) in sections 110 and 112, effective unit 202 may have a lens effect. That is, effective unit 202 may become a lens unit (e.g., a lenticular lens). Different voltages may be applied to one of sections 110 and 112 while applying a same voltage to the other section, or different voltages may be applied to both of sections 110 and 112.

Autostereoscopic display system 100 is also configured such that images from display device 12 are located at the focal plane of the lens unit. Thus, during operation, optical device 10 may be configured to have an array of effective units (e.g., a lenticular screen) used for autostereoscopic display. Further, system parameters of optical device 10 may be dynamically adjusted.

For example, if there is a need to adjust the lens grating width, instead of having n number of electrodes, effective unit 202 may be configured to have m number of electrodes from section 110 and/or section 112. When m<n, the lens grating width of effective unit 202 decreases, and when m>n, the lens grating width of effective unit 202 increases. However, because the thickness of effective unit 202 does not change, changes in the lens grating width may change the focal length of effective unit 202.

Such change in the focal length may cause images from display device 12 off the focal plane of optical device 10. To improve the quality of 3D images displayed by optical device 10, changes in the number of electrodes (i.e., m relative to n) may be kept in a certain range such that the change in the focal length is minimized. Further, image processing techniques may be used to optimize or adjust the parallax between sets of images for 3D display. For example, the range of parallax between the sets images may be slightly reduced according to a certain overall percentage, thus making the slight change in focal length go un-noticed by the viewer. Other methods may also be used.

Figure 2B:
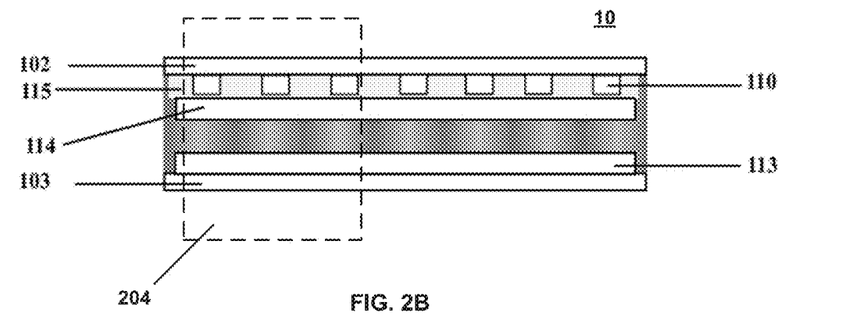
FIG. 2B illustrates another exemplary structure of an optical device consistent with the disclosed embodiments.

FIG. 2B illustrates another exemplary structure of optical device 10. As shown in FIG. 2B, in addition to substrates 102 and 103 and electrode section 110, optical device 10 may also include an electrode section 113, an electrode section 114, and an insulation layer 115. Insulation layer 115 may cover electrode section 110 and may also be attached to substrate 102. Electrode section 113 may include a single electrode in a plane shape; electrode 110 may include a plurality of electrodes in the shape of strips and arranged horizontally; and electrode section 114 may include a plurality of electrodes in the shape of strips and arranged vertically. Further, electrode section 110 is coupled with electrode section 114 through insulation layer 115 such that the plurality of electrode strips of section 110 and the plurality of electrode strips of section 114 form a grid of a plurality of grid cells. Each grid cell may be independently applied with a different voltage (similar to a thin-film transistor (TFT) structure).

This grid structure may allow different regions to have different grating width, length, and other parameters. For example, an effective unit 204 of optical device 10 may include n1 horizontal electrode strips from section 110 and n2 vertical electrode strips from section 114. Then applying different voltages to the n1 electrodes (while applying a same voltage or different voltages to the n2 electrodes) will form an electric field. The electric field can control molecules of optical material 101 to arrange in accordance with a certain angle along the electric field, and make optical material 101 have different optical paths in different locations or parts. This causes effective unit 204 to have a lens effect, i.e., to form a lens array unit, that can be used for 3D display.

Thus, horizontal electrode strips may cause a lens unit and may also control the lens grating width of the lens unit. Vertical electrode strips, on the other hand, may control the length of the lens unit. Thus, the length and grating width of the lens unit (i.e., effective unit 204) may be controlled dynamically. Optical device 10 may therefore be configured as one or more lens arrays with adjustable lens grating width and length.

Figure 2C:
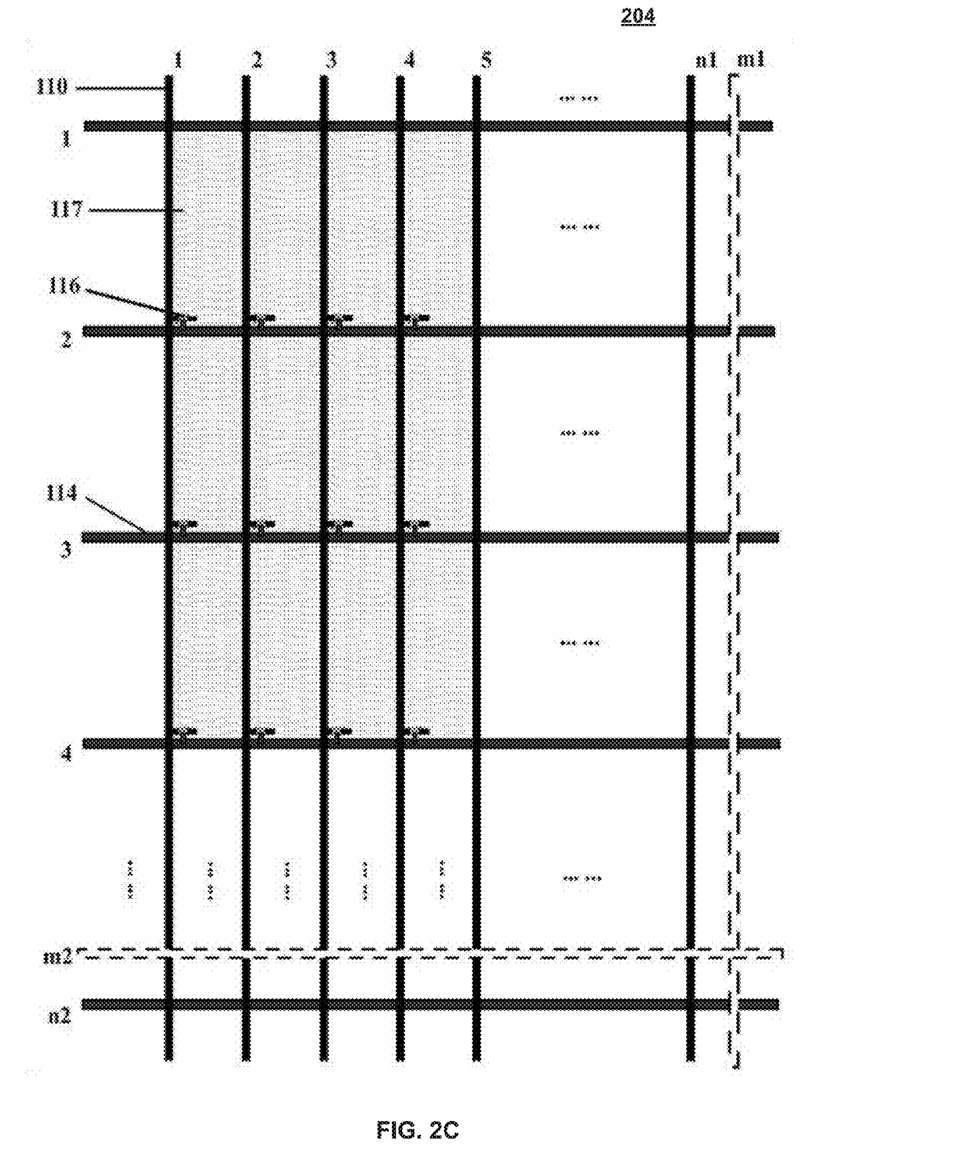
FIG. 2C illustrates an exemplary structure of an effective unit of an optical device consistent with the disclosed embodiments.

FIG. 2C illustrates an exemplary structure of electrode arrangement of an effective unit 204. As shown in FIG. 2C, effective unit 204 includes n1 (from number 1, 2, 3, 4, 5, . . . to n1) number of electrodes in section 110 and n2 (from number 1, 2, 3, 4, . . . to n2) number of electrodes in section 114. Also, n1 electrodes may be and arranged horizontally, and n2 electrodes may be arranged vertically. Further, n1 electrodes and/or n2 electrodes may also be in a strip shape or in a line shape. Other shapes may also be used. Switch circuits 116 (a TFT transistor switch or similar switch circuit, and the transistor switch is used for exemplary purposes) may be placed at cross-points of electrodes from sections 110 and 114. For example, as shown in FIG. 2C, a switch circuit 116 may be placed at every cross-point of electrode number 2 from section 114 and all electrodes from section 110. A switch circuit 116 may include any appropriate transistor switch or gate switch to be used to apply and hold certain voltages.

A thin layer of transparent conductive material 117 (e.g., indium tin oxide (ITO), or indium zinc oxide (IZO)) may be positioned on top of optical material 101 and connected to a switch circuit 116 to form a larger electrode as to have an even electric field and to improve voltage distribution and holding. The transparent conductive material layer 117 may be coupled to optical material 101 and separated into individual pieces such that the individual transparent conductive material pieces may separately cover individual grid areas or grid cells. Electrode section 110, electrode section 114, insulation layer 115, switch circuit 116, and/or transparent conductive material 117 may all be individually attached to substrate 102 using thin film and other semiconductor technologies. Other configurations and technologies may also be used.

A vertically-arranged electrode from section 114 may be used as a switch control, and may be connected with a gate terminal of a switch circuit 116 (i.e., a transistor switch), and a corresponding horizontally-arranged electrode from section 110 may be used as a voltage supplier and may be connected with a source terminal of switch circuit 116. Further, a corresponding piece of transparent conductive material may be connected to a drain terminal of switch circuit 116. Other connecting configurations may also be used.

During operation, vertically-arranged electrodes from section 114 may be scanned one by one in a sequence to apply corresponding voltages. For example, a first scanned electrode (e.g., electrode 2) may open all switch circuits 116 connected to that electrode. After all switch circuits 116 (e.g., switch circuits along electrode 2 from section 114) are turned on, corresponding voltages are applied to horizontally-arranged electrodes 1 to n1 at the same time, which in turn applies the various corresponding voltages to various transparent conductive material pieces covering corresponding grid areas or grid cells. The switch circuits 116 are then closed to keep or hold the various voltages. Afterwards, same steps may be applied to the next scanned electrode until all n2 vertically-arranged electrodes are scanned. These operations (e.g., scanning and applying voltages) may be controlled by controller 11 through driving unit 312.

By repeating the scanning process, effective unit 204 may function as one or more lens unit for autostereoscopic display. That is, every section of effective unit 204 (e.g., the area between vertically-arranged electrodes 1 and 2) may form a lens unit with a set of system parameters, or all sections of effective unit 204 may be configured in the same way such that effective unit 204 forms a single lens unit. When effective unit 204 acts as a single lens, the scanning process may be further simplified by applying a large voltage to all vertically arranged electrodes 1 to n2 to open all switch circuits 116 at the same time, and applying the various voltages to horizontally arranged electrodes 1 to n1. Further, as optical device 10 may include a plurality of effective units, to increase scanning speed, switch circuits 116 of effective units (i.e., lens) with the same grating width may be opened and closed at the same time.

The length and grating width of the lens unit may be controlled or adjusted dynamically. Horizontal electrode strips 1-n1 may control the lens grating width of the lens unit, and vertical electrode strips 1-n2 may control the length of the lens unit. For example, if there is a need to adjust the lens grating width and/or lens length, effective unit 204 may be configured to have m1 number of horizontal electrodes and/or m2 number of vertical electrodes. When m1<n1, the lens grating width of effective unit 204 decreases, and when m1>n1, the lens grating width of effective unit 204 increases. Similarly, when m2<n2, the lens length effective unit 204 decreases, and when m2>n2, the lens length effective unit 204 increases.

However, because the thickness of effective unit 204 does not change, changes in the lens grating width may change the focal length of effective unit 204. Such change in the focal length may cause images from display device 12 off the focal plane of optical device 10. To improve the quality of 3D images displayed by optical device 10, changes in the number of electrodes (i.e., m1 relative to n1) may be kept in a certain range such that the change in the focal length is minimized. Further, image processing techniques may be used to optimize or adjust the parallax between two sets of images for 3D display. For example, the range of parallax between the two sets images may be slightly reduced according to a certain overall percentage, thus making the slight change in focal length go un-noticed by viewer(s). Other methods may also be used.

Figure 2D:
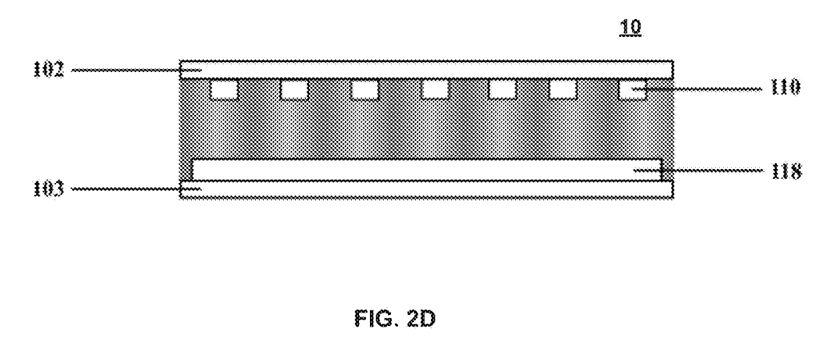
FIG. 2D illustrates another exemplary structure of an optical device consistent with the disclosed embodiments.

FIG. 2D illustrates another exemplary structure of optical device 10. As shown in FIG. 2D, electrode section 110 includes a plurality of electrode strips arranged horizontally, and electrode section 118 may include a single electrode in a plane shape. Similarly explained with respect to FIG. 2A, horizontally arranged strip electrodes may cause lens effect and may also control a grating width of a lens array unit.

Figure 2E:
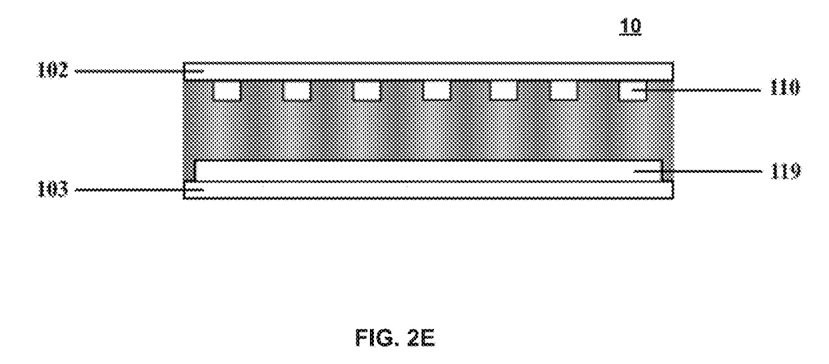
FIG. 2E illustrates another exemplary structure of an optical device consistent with the disclosed embodiments.

FIG. 2E illustrates another exemplary structure of optical device 10. As shown in FIG. 2E, electrode section 110 includes a plurality of electrode strips arranged horizontally, and electrode section 119 may include a plurality of electrode strips arranged vertically. Similarly explained with respect to FIG. 2B, horizontally arranged strip electrodes may cause lens effect and may also control a grating width of a lens unit, and vertically arranged strip electrodes may control a length of the lens array unit.

Figure 5:
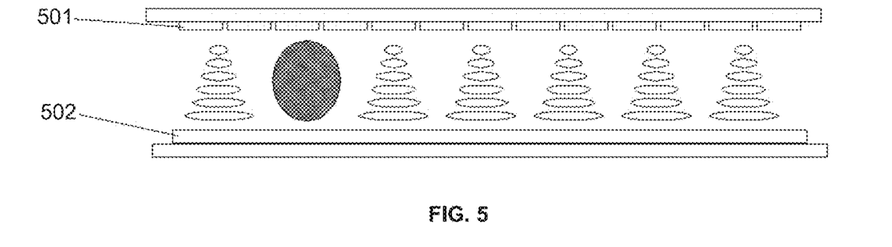
FIG. 5 illustrates another exemplary structure of an optical device consistent with the disclosed embodiments.

As previously mentioned, in addition to the lens grating, parallax barrier grating may also be configured similarly. That is, the liquid crystal of the optical device 10 can be controlled so that the parallax barrier grating can be implemented. In other words, the effective unit is a parallax barrier. FIG. 5 illustrates an exemplary parallax barrier grating consistent with the disclosed embodiments.

As shown in FIG. 5, the parallax barrier grating or parallax barrier array include a plurality of parallax barriers, and each parallax barrier is formed using a plurality of electrodes (i.e., activated electrodes). For example, electrode section 501 may include a plurality of stripe electrodes arranged laterally or horizontally. The electrode portion 502 may include a plurality of stripe electrodes longitudinally or vertically arranged.

The laterally-arranged strip electrodes may form a plurality of effective units, i.e., parallax barriers, and the width of the effective unit or parallax barrier may be determined based on the number of the laterally-arranged strip electrodes forming the effective unit or parallax barrier. The width of the parallax barrier is also referred as the grating width of the parallax barrier grating. On the other hand, the longitudinally-arranged strip electrodes may control the length of the parallax barrier and to control the display scope of 2D display and 3D display on the display screen, together with the laterally-arranged strip electrodes. The display scope of the 2D display and 3D display on the display screen may be similar to the above lens grating implementation.

As described below in details, the grating width or grating pitch of the parallax barrier grating can be controlled or adjusted dynamically to suit the requirements of different viewing distances. When the parallax barrier grating pitch is changed, the controller 11 may also adjust pixel display parameters to match the change of the grating width. Specifically, the change in grating width of the parallax barrier grating may be realized by controlling voltages to the strip electrodes forming the parallax barrier grating or effective unit, or by change in the plurality of the strip electrodes forming the parallax barrier grating or effective unit. The parallax barrier grating includes light-passing portions and light-blocking portions. When a grating width changes, the width of the light-blocking portion changes.

Figure 6:
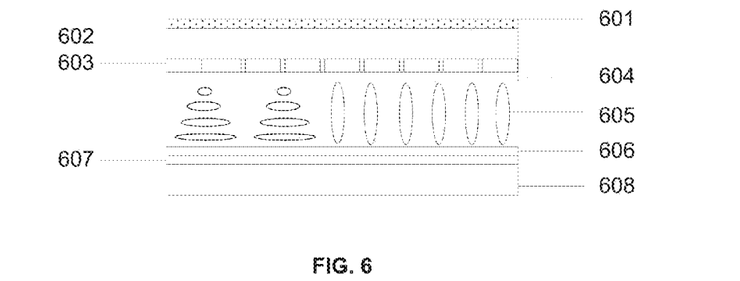
FIG. 6 illustrates another exemplary structure of an optical device consistent with the disclosed embodiments.
Figure 7:
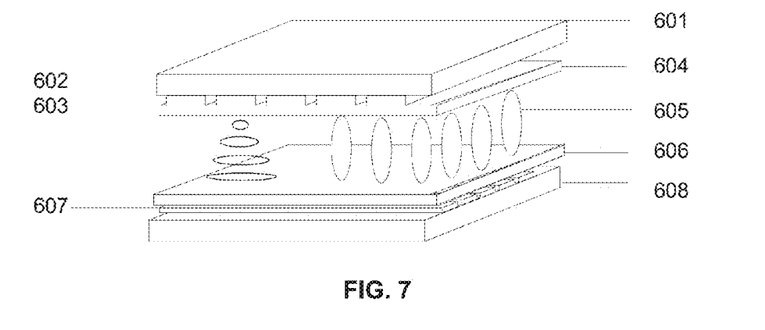
FIG. 7 illustrates another exemplary structure of an optical device consistent with the disclosed embodiments.

FIGS. 6-7 illustrate an exemplary parallax barrier device. As shown in FIGS. 6-7, parallax barrier device 600 may include a polarizer 601, a first substrate 602, a first electrode 603, a first alignment layer 604, a liquid crystal layer 605, a second alignment layer 606, a second electrode 607, and a second substrate 608. Certain components may be omitted and other components may be included.

The first electrode 603 includes a plurality of first sub-electrodes. The second electrode 607 includes a plurality of second sub-electrodes, and the second sub-electrodes and the first sub-electrodes are arranged in a cross over or intersecting position.

The liquid crystal layer 605 includes a plurality of liquid crystal molecules. The first electrode 603 and the second electrode 607 are disposed on both sides of the liquid crystal layer 605. The liquid crystal layer 605 forms respective display windows corresponding to the regions formed by the intersections of the first sub-electrodes and the second sub-electrodes.

Further, polarizer 601 can be disposed on the first electrode 603 or the second electrode 607 on the side away from the liquid crystal layer 605 and is configured to receive light emitting from the display panel.

In operation, various control voltages may be applied on the plurality of first sub-electrodes and/or the plurality of second sub-electrodes, such that the various display windows of the liquid crystal layer 605 can have different voltages or different voltage differences. The rotation of the liquid crystal molecules within the different display windows are also different corresponding to the different control voltages applied on the display windows. Thus, some of the polarized light of images from the display panel can pass through some display windows and also pass through the polarizer 601, while some other polarized light of the images from the display panel cannot pass through the polarizer 601 after passing through some display windows. Thus, the display windows can display a pattern of brightness and darkness windows so as to form a parallax barrier with adjustable display scope of 3D display.

Thus, according to the disclosed embodiments, the first electrode 603 and the second electrode 607 of the parallax barrier device both comprise a plurality of sub-electrodes, and the plurality of first sub-electrodes and the plurality of second sub-electrode are disposed in an intersectional or crossover arrangement. The intersected second sub-electrodes and first sub-electrodes can divide the liquid crystal layer into a plurality of display windows. By controlling the voltage differences applied between the first sub-electrodes and the second sub-electrodes, after the polarized image light passes through the plurality of display windows, some of the passing light can pass the polarizer while other portion of the passing light cannot pass the polarizer. Thus, the plurality of display windows show a pattern of bright-dark states, forming a transparent and opaque grating structure, i.e., forming a parallax barrier. Thus, integrated 2D and 3D display (i.e., displaying 2D and 3D information at the same time on the same display screen) can be achieved. Moreover, by controlling the voltage differences between the first sub-electrodes and the second sub-electrodes, the aperture ratio of the parallax barrier can be arbitrarily adjusted in real time.

Thus, according to disclosed embodiments, the birefringence of the liquid crystal is used to change the polarization state of the passing light such that the linearly polarized incident image light can be transmitted at respective different polarization directions. Under the effect of the polarizer as the outermost layer, a transparent and opaque grating structure can be formed, generating a parallax barrier.

Further, the parallax barrier device can be controlled by the controller 11. The controller 11 is coupled to the respective first sub-electrodes and second sub-electrodes to control the voltage applied on each of the first sub-electrodes and second sub-electrodes such that, after the polarized image light passes through the plurality of display windows, some of the passing light can pass the polarizer while some other passing light cannot pass the polarizer.

That is, the controller 11 can implement the control on the voltage difference of each of the display windows of the liquid crystal layer. When the voltage difference applied on a display window is greater than the threshold voltage of the liquid crystal molecules of the liquid crystal layer, the display window is in the dark/opaque state. When the voltage difference applied on a display window is less than the threshold voltage of the liquid crystal molecules in the liquid crystal layer, the display window is in the bright/transparent state. Thus, by controlling whether the linear polarized light passing through each display window can pass through the polarizer, the plurality of display windows can be in the dark state or the bright state so as to form the parallax barrier.

The controller can also be configured to selectively control the voltage difference of one or more display windows, such that the voltage difference is greater than the threshold voltage of the liquid crystal molecules in the liquid crystal layer. The voltage difference control may be performed on selected one or more adjacent display windows, such as three laterally or horizontally adjacent display windows. Or voltage difference control may be performed on selected one or more non-adjacent display windows, such as three longitudinally or vertically spaced/separated display windows. By selectively controlling the voltage difference of the display windows, it can be arbitrarily controlled whether the linearly polarized light passing through any particular display window can pass through the polarizer, so that the plurality of display windows can be in the bright/dark state to form a parallax barrier.

The controller can also be configured to adjust the voltage of one or more sub-electrodes based on the display effect. For example, the controller may adjust the voltage of one or more sub-electrodes of the first electrode; may adjust the voltage of one or more sub-electrodes of the second electrode; or may simultaneously adjust the voltage of one or more sub-electrodes of the first electrode and one or more sub-electrodes of the second electrode, such that the voltage difference between each first sub-electrode and each second sub-electrode can be controlled to adjust the display effect.

Further, the shape of the first sub-electrode and/or the second sub-electrode may be one of strip, zigzag, or extended curve shaped, or other regular or irregular shape. In certain embodiments, each sub-electrode is strip shaped. The sub-electrodes of the first electrode may be arranged in parallel, and the sub-electrodes of the second electrode may also be arranged in parallel. The angle formed between the first sub-electrodes and the second sub-electrodes may be approximately 60 to 160 degrees. For example, the first sub-electrodes and the second sub-electrodes may be disposed perpendicular to each other, i.e., the angle is formed by approximately 90 degrees.

When the first sub-electrodes and second sub-electrodes are disposed perpendicularly, by controlling the voltages on the respective sub-electrodes, it can be achieved that the voltage difference between horizontal sub-electrodes and vertical sub-electrode is greater than the threshold voltage of the liquid crystal molecules, so that the liquid crystal layer can display horizontal or vertical darkness to enable 3D display for horizontal screen or vertical screen. Further, by applying voltages on sub-electrodes from different rows and different columns, the bright/dark state of individual display windows can be individually and separately controlled. That is, the parallax barrier can realize bright and dark display windows.

Among the sub-electrodes of the first electrode or the second electrode, at least two adjacent sub-electrodes can form an electrode group or sub-electrode group. For each sub-electrode group, the display window corresponding to at least one sub-electrode and its respective intersecting sub-electrode is in the bright state, while all other display windows are in the dark state. In certain embodiments, in each sub-electrode group, when the display window corresponding to at least two sub-electrodes and the respective intersecting sub-electrodes is in the bright state, and other display windows are in the dark state, the at least two sub-electrodes are adjacent sub-electrodes.

Referring again to FIGS. 6 and 7, the parallax barrier device also includes the first substrate 602 and the second substrate 608. The first electrode 603 and the second electrode 607 are transparent and disposed on the inner side of the substrate 602 and the substrate 608, respectively. The first alignment layer 604 is disposed on top surface of the first electrode 603, and the second alignment layer 606 is disposed on top surface of the second electrode 607. The liquid crystal layer 605 is disposed between the first alignment layer 604 and the second alignment layer 606.

The first sub-electrodes are arranged on the first substrate 602 in parallel and at a predetermined interval from each other. The first alignment layer 604 is formed on the upper surface of each of the first sub-electrodes and in the gap between adjacent first sub-electrodes, such that the first sub-electrodes are insulated from each other. Similarly, the second sub-electrodes are arranged on the second substrate 608 in parallel and at a predetermined interval from each other. The second alignment layer 606 is formed on the upper surface of each of the second sub-electrodes and in the gap between adjacent second sub-electrodes, such that the second sub-electrodes are insulated from each other.

Further, the parallax barrier device also includes a sealant frame (not shown) for sealing the liquid crystal molecules between the two alignment layers 604 and 606. Further, one or more pads or spacers are placed between the two alignment layers 604 and 606 for setting the distance between the two alignment layers 604 and 606, and for ensuring the distance between the two alignment layers 604 and 606 is a predetermined distance.

Figure 8:
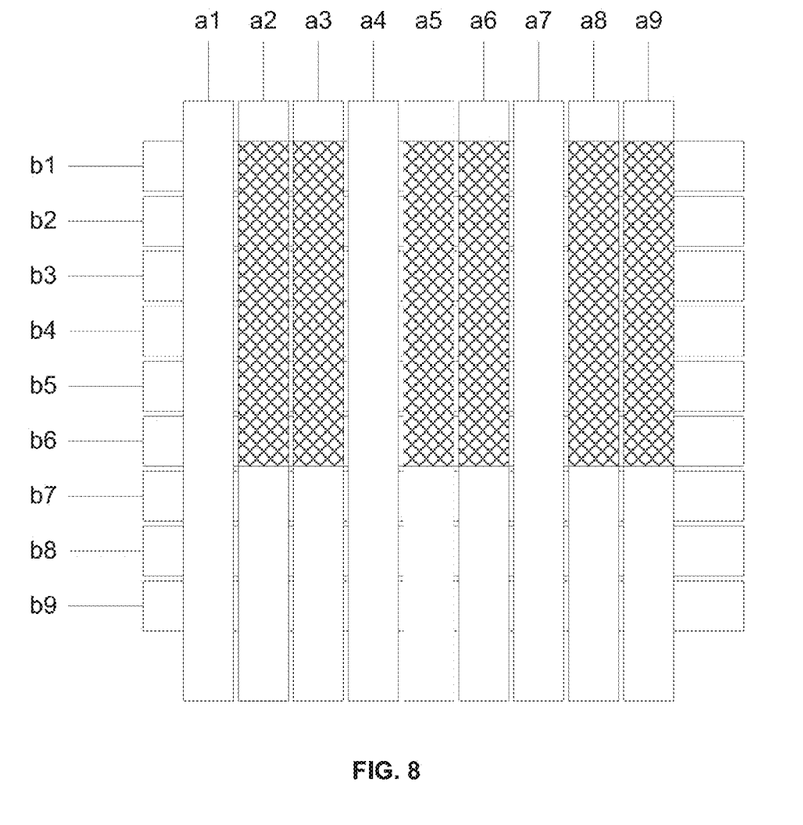
FIG. 8 illustrates another exemplary structure of an optical device consistent with the disclosed embodiments.

FIG. 8 illustrates an exemplary parallax barrier with partially applied voltages. As shown in FIG. 8, the first electrode includes first strip sub-electrodes a1-a9 arranged in parallel at a first interval, and the second electrode includes second strip sub-electrodes b1-b9 arranged in parallel at a second interval. Thus, 9×9 display windows are formed by the sub-electrodes a1-a9 and the sub-electrodes b1-b9, each display window corresponds to a portion of liquid crystal molecules of the liquid crystal layer.

For the convenience of illustration, the 9×9 display windows shown in FIG. 8 can be viewed as a two-dimensional 9×9 matrix. The columns of the two-dimensional matrix represent the sub-electrodes of the first electrode 603, and the rows of the two-dimensional matrix represent the sub-electrodes of the second electrode 607. The display window corresponding to the i-th row (i=1, . . . , 9) and j-th column (j=1, . . . , 9) is represented by $a_{ij}$.

When no voltage is applied on the i-th row sub-electrode and the j-th column sub-electrode, or when voltages $U_i$ and $U_j$ are respectively applied on the i-th row sub-electrode and the j-th column sub-electrode and the difference between $U_i$ and $U_j$ is less than the threshold voltage of the liquid crystal molecules, under the effect of the first alignment layer 604 and the second alignment layer 606, the liquid crystal molecules within $a_{ij}$ are twisted by 90 degrees. Thus, the linearly polarized incident light with the polarization direction parallel to the rubbing direction of the incident substrate passes through $a_{ij}$, and the outgoing light is linearly polarized light with the polarization direction perpendicular to the polarization direction of the incident linearly polarized light. At this time, the polarization direction of the outgoing light is the same as the polarization direction of the polarizer 601, i.e., the outgoing light can pass through the polarizer 601, and the display window $a_{ij}$ is in the bright state.

When voltages $U_i$ and $U_j$ are respectively applied on the i-th row sub-electrode and the j-th column sub-electrode and the voltage difference between $U_i$ and $U_j$ is greater than the threshold voltage of the liquid crystal molecules, under the effect of the electric field created by the voltage difference, the long axis of the liquid crystal molecules within display window $a_{ij}$ is rotated to be perpendicular to the direction of the first substrate 602 and the second substrate 608. At this time, display window $a_{ij}$ does not change the polarization state of the incident linearly polarized light, and the polarization direction of the outgoing polarized light (i.e., polarized light passing through $a_{ij}$) is perpendicular to the polarization direction of the polarizer 601, and display window $a_{ij}$ is in the dark state. Thus, by applying voltages on sub-electrodes from different rows and different columns, the bright/dark state of individual display windows can be individually and separately controlled. That is, the parallax barrier can realize bright and dark display windows control.

More specifically, for example, voltage $U_0$ is applied on the second sub-electrodes b1 to b6, voltage $U_1$ is applied on the first sub-electrodes a2, a3, a5, a6, a8, a9, and no voltage is applied on the remaining sub-electrodes. The voltages satisfy the following relation: $|U_1-U_0|$ is greater than the threshold voltage $U_{th}$ of the liquid crystal molecules; and both $|U_0|$ and $|U_1|$ are less than $U_{th}$.

Under such voltage relationships, as shown in FIG. 8, the long axis direction of liquid crystal molecules within the display windows corresponding to the above sub-electrodes (shown in shaded area) is perpendicular to the substrates, and cannot rotate the polarization state of the incident light by 90 degrees. Thus, the outgoing light from these display windows has a polarization direction perpendicular to the polarization direction of the polarizer 601, and the outgoing light from these display windows cannot pass through the polarizer 601, forming dark display windows.

If using every 3 column sub-electrodes as a period, a parallax barrier with an aperture ratio of 1/3 is formed. Clearly, if selecting only one second sub-electrode within the period and applying voltage $U_0$ on the selected second sub-electrode, while keeping other conditions unchanged, a parallax barrier with an aperture ratio of 2/3 is formed. Thus, the aperture ratio of the parallax barrier can be adjusted. Because no voltage is applied on the sub-electrodes of other display windows or the applied voltage on the liquid crystal molecules is less than $U_{th}$, the incident light is capable of passing through the liquid crystal layer and the polarizer 601 to form bright regions, without forming parallax barriers.

The controller 11 may determine the voltages to be applied on the first sub-electrodes and the second sub-electrodes based on the content information of the images on the display panel. For example, if the controller 11 determines that content information of a display region is 2D information, the controller 11 may control the voltages for the display windows of the display region to pass the image light. On the other hand, if the controller 11 determines that content information of a display region is 3D information, the controller 11 may control the voltages for the display windows of the display region to form a parallax barrier to effect 3D display.

Figure 9:
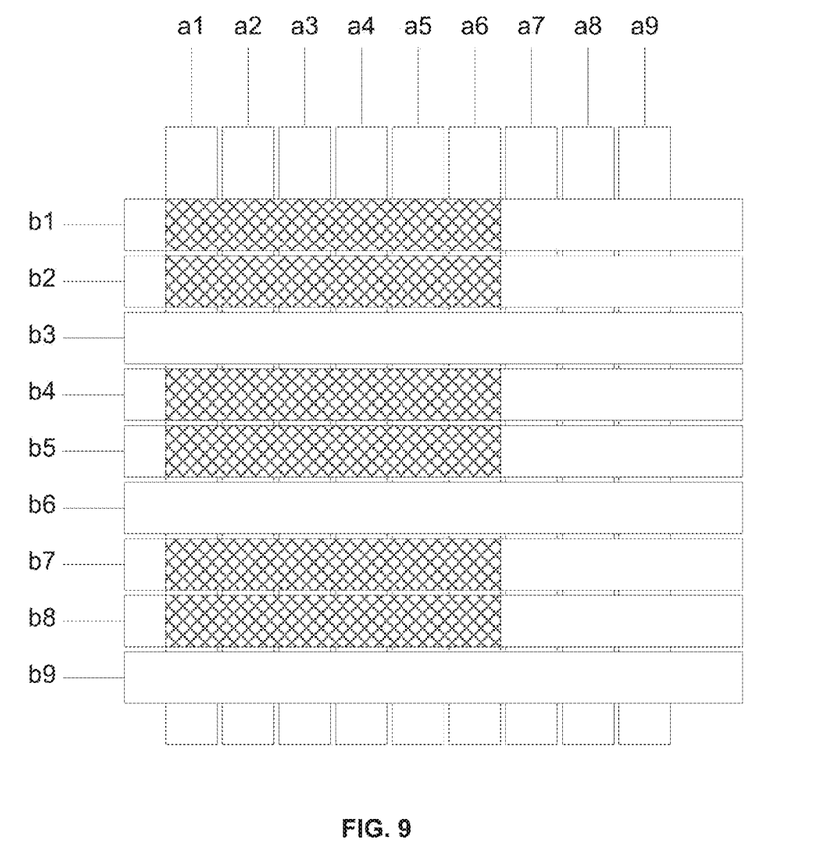
FIG. 9 illustrates another exemplary structure of an optical device consistent with the disclosed embodiments.

FIG. 9 illustrates another exemplary parallax barrier with partially applied voltages. As shown in FIG. 9, voltage $U_0$ is applied on the first sub-electrodes a1 to a6, voltage $U_1$ is applied on the second sub-electrodes b1, b2, b4, b5, b7, and b8, and no voltage is applied on the remaining sub-electrodes. The parallax barrier can be formed as shown in FIG. 9, the long axis direction of liquid crystal molecules corresponding to the respective sub-electrodes is arranged perpendicular to the substrate, forming dark areas. As shown in FIGS. 8 and 9, respectively, dark areas are formed vertically and horizontally, meeting the need of vertical screen and horizontal screen viewing.

Each of the first electrode and the second electrode includes a plurality of strip sub-electrodes, arranged overlapped with each other. The distance between two sub-electrodes adjacent to a same sub-electrode is less than or equal to the width of the same sub-electrode, such that adjacent sub-electrodes are overlapped with each other, eliminating the weak crosstalk caused by the small gap between the sub-electrodes and improving the 3D display effects.

During operation, controller 11 or, more particularly, processor 302 may perform certain processes to control and/or adjust optical device 10 to improve quality and viewing comfort of displayed 3D images. The processes may be implemented based on hardware, software, or a combination of hardware and software. FIG. 9 illustrates an exemplary process 400 performed by controller 11 (e.g., processor 302) for optical devices illustrated in FIGS. 2A-2E and 4-6. When optical devices illustrated in FIGS. 2A-2E are switchable parallax barrier grating, intervals between the sub-electrodes are changed to smaller.

As shown in FIG. 9, processor 302 may receive certain information about operation and/or usage of autostereoscopic display system 100 (Step 402). For example, processor 302 may receive information about a viewer changing his/her viewing distance or viewing position, etc. Processor 302 may also detect or receive that parallax between sets of images for 3D display exceeds a preferred parallax range corresponding to current system configuration. Other information may also be used, such as 3D display region information. Based on received information (e.g., a new distance L, or an out-of-range parallax), processor 302 may determine whether to adjust a system parameter of optical device 10 (Step 404). For example, processor 302 may determine whether to adjust a grating width of optical device 10. Other system parameters, such as lens length of optical device 10, may also be checked to see whether adjustment is needed. Processor 302 may determine to adjust the grating width if the viewing distance L changes or if the parallax between received sets of images for 3D display exceeds the preferred parallax range.

If processor 302 determines not to adjust the system parameter (Step 404; no), processor 302 may complete the process. On the other hand, if processor 302 determines to adjust the system parameter (Step 404; yes), processor 302 may calculate parallax information based on received sets of images (Step 406). For example, processor 302 may calculate or obtain parallax values between sets of images based on parallax between each image element from the sets of images. An image element may include a single pixel or a block of pixels, and have an area of size α.

Processor 302 may determine a range of parallax based on calculated parallax values between the minimum value d1 and the maximum value d2 (Step 408). In a case of out-of-range parallax, processor 302 may also determine a new parallax range or values (d1, d2). Further, processor 302 may also determine a new system parameter (Step 410). For example, processor 302 may determine a new grating width w. Or processor 302 may determine a new lens width, length or a new lens parameter such as aperture, etc., for a lens grating, or may determine a new parallax barrier width, length, or other dimensional parameters of the parallax barrier. Processor 302 may determine the new grating width w based on a relationship between the grating width and the parallax range (d1, d2), size α, and viewing distance L. Such relationship may be represented by a function w=F(d1, d2, α, L). This function F may be determined based on experiments or may be determined through any appropriate algorithms.

After determining the new system parameter value such as the new grating width w (Step 410), processor 302 may control other devices (e.g., driving unit 312) to dynamically adjust optical device 10 to the new system parameter value such as the new grating width (Step 412). That is, the new system parameter value is applied to optical device 10 under the control of processor 302. For example, details of adjusting the grating width or length are illustrated in previous sections (e.g., by dynamically adjusting certain number of electrodes of an effective unit or changing voltages applied to certain number of electrodes). Processor 302 may individually adjust each effective unit of optical device 10 or may uniformly adjust some or all effective units of optical device 10 depending on specific applications. Further, processor 302 may separately adjust different parts of a particular effective unit as shown in FIG. 2C and described in previous sections.

Further, optionally, processor 302 may optimize or adjust parallax of sets of images based on the new system parameter value such as the new grating width (Step 414). As explained previously, a change in grating width of an effective unit of optical device 10 may cause a slight change in the focal length of the effective unit. Processor 302 may determine the change value in the focal length. Based on the change value, processor 302 may determine an overall percentage of change to adjust parallax between sets of images, i.e., to reduce or increase the parallax between sets of images. Further, processor 302 may also apply the overall percentage of change in parallax to sets of images as displayed by display device 12.

By using the disclosed structures, parameter-adjustable optical devices may be created to be used in 3D display systems. By dynamically adjusting the parameters, such as grating width and length of the optical devices, a large range of parallax may be accommodated in avoid interference and ghosting in 3D images. Further, the disclosed parameter-adjustable autostereoscopic display system may allow viewers to view 3D display more comfortably, thereby reducing some of the symptoms caused by watching 3D display for a long time, such as dizziness and nausea.

What is claimed is:

1. A three-dimensional (3D) display system, comprising:
   a display device configured to display a set of images with parallax for three-dimensional (3D) display; and
   a switchable grating comprising a plurality of switchable grating units, each switchable grating unit having a variable grating width and variable refractive index, coupled with the display device, and configured to enable directional light transmission so as to separate lights of the set of images into predetermined viewing directions to effect the 3D display, wherein the switchable grating includes:
   a first substrate having a plurality of first-type electrodes arranged in a first direction;
   a second substrate having at least one second-type electrode;
   a plurality of third-type electrodes arranged in a third direction being different from the first direction and intersecting the plurality of first-type electrodes to form a gird, and
   an optical material contained between the first substrate and the second substrate and configured to form the plurality of switchable grating units in the switchable grating when a plurality of voltages are applied to the first-type electrodes and the second-type electrode,
   wherein the plurality of voltages are arranged as a series of voltage patterns, each being applied on a number of the plurality of first-type electrodes to form a switchable grating unit with a corresponding grating width, and
   a number of activated electrodes of the third-type electrodes determines a lens length of the switchable grating unit.

2. The 3D display system according to claim 1, the switchable grating further includes:
   an insulation layer covering the plurality of first-type electrodes; and
   the third-type electrodes are coupled to the plurality of first-type electrodes through the insulation layer such that the plurality of first-type electrodes intersect the plurality of third-type electrodes to form the grid including a plurality of grid cells.

3. The 3D display system according to claim 2, wherein the 3D display system further includes a controller:
   the switchable grating is a switchable lens grating and the switchable grating unit is a switchable lens; and
   a first number of activated electrodes of the third-type electrodes determine an initial lens length of the switchable lens, and the controller is configured to set a second number of activated electrodes of the third-type electrode to adjust the lens length of the switchable lens dynamically.

4. The 3D display system according to claim 3, further including:
   a transparent conductive material layer configured into a plurality of transparent conductive material pieces, each transparent conductive material piece covering a grid cell and configured to be an electrode of the grid cell; and
   a plurality of switches associated with cross-points of the grid and coupled to the plurality of transparent conductive material pieces, respectively.

5. The 3D display system according to claim 4, wherein:
the plurality of third-type electrodes are coupled to the plurality of switches to control an on-off state of the plurality of switches; and
the plurality of first-type electrodes are coupled to the plurality of switches to provide various voltages to the plurality of transparent conductive material pieces such that the optical material forms the switchable lens.

6. The 3D display system according to claim 4, wherein:
the plurality of first-type electrodes, the plurality of third-type electrodes, the insulation layer, the transparent conductive material layer, and the plurality of switches are arranged on the first substrate.

7. The 3D display system according to claim 4, wherein the controller is configured to scan the plurality of third-type electrodes in a sequence and, for each scanned electrode, to open switches coupled to the scanned electrode, to apply the various voltages to the plurality of first-type electrodes, and to close the switches to hold the various voltages.

8. The 3D display system according to claim 4, wherein:
the controller is configured to scan third-type electrodes of a switchable lens as a group and, for each scanned electrode group, to open switches coupled to the scanned electrode group, to apply the various voltages to the plurality of first-type electrodes, and to close the switches to hold the various voltages.

9. The 3D display system according to claim 2, wherein the controller is configured to:
determine whether to adjust at least one system parameter of width, length, size, and orientation of the switchable gratings units;
when determining to adjust the at least one system parameter of width, length, size, and orientation of the switchable gratings units, determine a new system parameter of width, length, size, and orientation of the switchable gratings units; and
when determining to adjust the switchable gratings units to the new system parameter, change a number of the plurality of first-type electrodes and a number of the plurality of third-type electrodes corresponding to each switchable grating unit.

10. The 3D display system according to claim 9, wherein changing the number of the first-type electrodes and the number of the plurality of third-type electrodes is performed to minimize a change in a focal length of the switchable grating unit, thereby facilitating images from the display device to be substantially on a focal plane of the switchable grating unit.

11. The 3D display system according to claim 9, wherein the controller is configured to adjust a parallax between a set of images according to a overall percentage such that the change in the focal length of the switchable grating unit is minimized.

12. An optical device, comprising:
a first substrate having a plurality of first-type electrodes;
a second substrate having at least one second-type electrode;
a plurality of third-type electrodes arranged in a third direction being different from the first direction and intersecting the plurality of first-type electrodes to form a gird, and
an optical material contained between the first substrate and the second substrate and configured to form a switchable grating containing a plurality of switchable grating units when a plurality of voltages are applied to the first-type electrodes and second-type electrode,
wherein each switchable grating unit has variable width and variable refractive index, and the switchable grating is coupled with a display device and configured to enable directional light transmission so as to separate lights of a set of images into predetermined viewing directions to effect 3D display; and
wherein the plurality of voltages are arranged as a series of voltage patterns, each being applied on a number of the plurality of first-type electrodes to form the switchable grating unit with a corresponding width, and
a number of activated electrodes of the third-type electrodes determines a lens length of the switchable grating unit.

13. The optical device according to claim 12, wherein:
the switchable grating is a switchable lens grating and the switchable grating unit is a switchable lens;
the plurality of first-type electrodes are arranged in a first direction and a first number of electrodes of the first-type electrodes form a switchable lens of the switchable lens grating and determine a width of the switchable lens; and
a second number of electrodes of the first-type electrodes form the switchable lens so as to adjust the width of the switchable lens dynamically.

14. The optical device according to claim 12, further including:
an insulation layer covering the plurality of first-type electrodes; and
the third-type electrodes are coupled to the plurality of first-type electrodes through the insulation layer such that the plurality of first-type electrodes intersect the plurality of third-type electrodes to form the grid including a plurality of grid cells.

15. The optical device according to claim 14, wherein:
the switchable grating is a switchable lens grating and the switchable grating unit is a switchable lens; and
a first number of electrodes of the third-type electrodes determine an initial lens length of the switchable lens, and a second number of electrodes of the third-type electrode is set to adjust the lens length of the switchable lens dynamically.

* * * * *